(12) United States Patent  (10) Patent No.: US 7,577,685 B2
Meier et al.  (45) Date of Patent: Aug. 18, 2009

(54) COMPUTER-IMPLEMENTED SYSTEM FOR MANAGING A DATABASE SYSTEM WITH STRUCTURED DATA RECORDS

(75) Inventors: Guido Meier, Mellingen (CH); Michael Thaler, Wohlen (CH)

(73) Assignee: UBS AG, Zurich (CH)

( * ) Notice: Subject to any disclaimer, the term of this patent is extended or adjusted under 35 U.S.C. 154(b) by 547 days.

(21) Appl. No.: 11/484,600

(22) Filed: Jul. 12, 2006

(65) Prior Publication Data

US 2007/0198592 A1 Aug. 23, 2007

(30) Foreign Application Priority Data

Feb. 21, 2006 (EP) .................................. 06003484

(51) Int. Cl.
*G06F 17/00* (2006.01)
(52) U.S. Cl. .................... 707/104.1; 707/101; 707/102; 707/103 R
(58) Field of Classification Search .............. 707/1–10, 707/100–104.1, 200–206
See application file for complete search history.

(56) References Cited

U.S. PATENT DOCUMENTS

| 5,689,579 | A | 11/1997 | Josephson | 382/137 |
| 2003/0126102 | A1 | 7/2003 | Borthwick | 706/21 |
| 2004/0167808 | A1 | 8/2004 | Fredericks et al. | 705/5 |
| 2005/0114239 | A1 | 5/2005 | Fiascone et al. | 705/30 |

FOREIGN PATENT DOCUMENTS

DE 102 06 734 A1 9/2003

OTHER PUBLICATIONS

European Search Report dated May 26, 2006 English Language Abstract of DE 102 06 734 A1.
International Search Report Dated May 10, 2007.

*Primary Examiner*—Isaac M Woo
(74) *Attorney, Agent, or Firm*—Michael Bednarek; Paul, Hastings, Janofsky & Walker LLP

(57) ABSTRACT

In a computer-implemented system for managing a database system with structured data records, two internal databases separate from one another are maintained, an interface for an input at least of parts of a structured data record into one of the databases is provided, at least one interface for communicating with an external database system is provided, in order to communicate between one of the internal databases and the external database. Initiated by inputting of a new data record into the first database, inputting of a new corresponding data record into the second database only takes place if a confirmation was received from the external database regarding the successful inputting of a corresponding new data record into the external database, and in the event of a difference between the new data record in the first database and a probably corresponding new data record from the external database, a probability is assigned to the probably corresponding new data record from the external database depending on the degree of difference, and from further data records from the external database a data record is extracted that has a higher probability of being the correct corresponding new data record.

15 Claims, 1 Drawing Sheet

COMPUTER-IMPLEMENTED SYSTEM FOR MANAGING A DATABASE SYSTEM WITH STRUCTURED DATA RECORDS

BACKGROUND TO THE INVENTION

Many companies base their business also on databases, which they manage in the framework of business transactions and in which a large number of structured data records are held and are to be maintained if necessary. In this regard new data records that are generated in the company and are to be entered manually in the database, or changes to these, arise on the one hand. On the other hand, the amount of data occurring in the context of electronic data traffic between companies is increasing more and more. The same also applies to authorities. At all events, in connection with the provision of services, establishment and conduct of business relationships, or in the exercise of governmental duties, structured and systematic data production, processing, administration and representation of the services provided, business relationships entered into or the like are necessary.

PROBLEMS FORMING THE BASIS OF THE INVENTION

It can entail considerable outlay if the database of a company (for example, a bank) or an authority has to correspond exactly to the database of another company/another authority. This requirement, which ostensibly appears self-evident, then becomes an extremely demanding task if (i) a company is exchanging data with other different companies concerning a plurality of transactions, if (ii) in addition data records of transactions are input manually into the database of the company, if (iii) national borders are crossed in the data exchange and in this case state control mechanisms can intervene, or if (iv) at certain times (reference dates for dividend and interest payments or for capital transactions, share divisions, capital increases or the like) congruence has to be created, and if (v) in this case backgrounds and details of the transactions associated with the data arising also have to be reproducible if necessary. Apart from this, several databases are often to be maintained within the sphere of a bank on account of banking and/or statutory stipulations, which databases are to be matched at certain times. Transaction in this case is understood to mean any business occurrence between for example two or more banks/financial institutions and/or their customers.

OBJECT OF THE INVENTION

The object of the invention is to show a way how transactions are to be handled securely and correctly, and the data traffic within a bank occurring in the context of these transactions in computer-implemented systems for managing a database system with structured data records, the data traffic of the bank with other banks or the data traffic of the bank with institutional or private customers/partners at home and abroad is to be organised efficiently.

SOLUTION ACCORDING TO THE INVENTION

To achieve this object, two internal databases separate from one another are maintained according to the invention in a computer-implemented system for managing a database system with structured data records concerning one or more transactions. Furthermore, an interface for an input at least of parts of a structured data record of the transaction into one of the databases is provided, and at least one interface for communicating with an external database system is provided, in order to communicate between one of the internal databases and the external database. Inputting a new data record of the transaction into the first database initiates inputting of a new corresponding data record into the second database. However, inputting of the new corresponding data record into the second database only takes place if a confirmation was received from the external database regarding the successful execution of the transaction, and in the event of a difference between the new data record in the first database and a presumably corresponding new data record from the external database, a probability is assigned to the probably corresponding new data record from the external database depending on the degree of difference, and a data record is extracted from further data records from the external database that has a higher probability of being the correct corresponding new data record.

In other words, the invention provides a concept of how to proceed to avoid unnecessary data traffic between individual databases or their operators (in a data network, for example the SWIFT network) if inconsistencies arising occur between data records in the database system of the bank and/or between data records of the database system and an external database system. (SWIFT is the abbreviation for Society for Worldwide Interbank Financial Telecommunication. This is an international association of financial institutions, which maintains a telecommunications network (SWIFT network) for communication between these.) The outlay on manual reworking in the event of inconsistencies, and also the other data traffic in connection with such clarifications are also reduced by the invention.

Here it is assumed that in connection with the transaction in the sphere of the external database inputting of a corresponding new data record into the external database takes place.

The system according to the invention is used preferably for handling transactions of securities in/for a bank, and the first database being an account of a customer or partner of the bank for transactions, and/or the second database being a nostro account of the bank.

The term security as used in connection with the present invention refers to a document that evidences a private right to something such that the holding or possession of the document is required for asserting the right. Bearer instruments and order instruments are included in this, instruments not to order are excluded. However, a so-called certificate of deposit (of the bank, that the shares are kept safe in its deposit), which is sufficient for example to exercise the right to participation in the shareholders' general meeting, is not a security in the sense of the present invention. In a narrower sense, stocks and bonds are securities, thus for example shares, participation certificates, subscription warrants, annuity-certificates or debentures, thus mortgage bonds, bearer debentures, medium term bonds, convertible bonds, certificates etc.). Furthermore, shares in a collective security holding or in a collective government ledger bond, as well as rights to delivery or allocation of commercial papers are also considered as securities in the sense of the present invention. The same applies to derivatives (derivatives are financial instruments that are derived from media of investment (for example shares, bonds, foreign currency) traded on the spot market. The valuation is determined predominantly by price, price fluctuations and price expectations of the primary instruments that form the basis. Known derivatives are futures, options and swaps) and structured financial products (structured financial products are financial instruments that can be understood as combinations of state securities of the spot and futures markets (e.g.

shares, interest products, derivatives). This combination of a plurality of individual components facilitates the acceptance of a large number of of risk-return profiles.)

Securities in the narrower sense are identified in the various markets by different but respectively clear identifiers (for example ISIN, WKN, CUSIP, etc.). The twelve-digit number-letter combination ISIN (International Securities Identification Number) has the following structure, for example:

| Country code | National identification no. | Check digit |
|---|---|---|
| DE | 000575200 | 0 | in which the previous WertschriftenKennNummer (securities identification number) WKN (here: Bayer AG, WKN 575200) is included right-aligned, the front places being filled with zeros.

From the viewpoint of Bank A, a nostro account is an account that Bank A maintains at a correspondent bank B. From the viewpoint of Bank B, the account is a vostro account. Transactions in the sense of this invention are to be understood as security deliveries on the basis of an order or a stock exchange transaction. The delivery can take place in connection with a money payment (delivery against payment) or as a pure transaction (delivery without payment). An order can refer to one or more items. However, with reference to processing and handling each item represents a separate transaction.

A delivery without payment has the following steps:

1a. A customer gives Bank X a security delivery order for -y- shares ISIN vvvv

1b. Customer sends Bank U an advance notification (receipt by Bank U -y- shares ISIN vvvv)

2a. Bank X sends a delivery instruction to a securities clearing house (to Bank U -y- shares ISIN vvvv)

2b. Bank U sends the securities clearing house a receipt instruction (from Bank X -y- shares ISIN vvvv)

3a. The securities clearing house sends Bank X a confirmation of execution (outgoing)

3b. The securities clearing house sends Bank U a confirmation of execution (receipt)

4a. Bank X draws up a delivery notification for the customer (outgoing).

4b. Bank U draws up a delivery notification for the customer (receipt) and updates its second database.

A delivery against payment "DELIVERY versus PAYMENT" has the following steps:

1a. Customer X gives Bank X a security delivery order for -z- shares ISIN vvvv against payment of CHF n,nnnn.—

1b. Customer Y sends Bank U a security delivery order for -z- shares ISIN vvvv against payment of CHF n,nnnn.—

2a. Bank X sends the securities clearing house a delivery instruction (to Bank U -z- shares ISIN vvvv against payment of CHF n,nnnn.—)

2b. Bank U sends the securities clearing house a receipt instruction (from Bank X -z- shares ISIN vvvv against payment of CHF n,nnnn.—)

3a. The securities clearing house sends Bank X a confirmation of execution (outgoing)

3b. The securities clearing house sends Bank U a confirmation of execution (receipt)

4a. Bank X draws up a delivery notification for the customer (outgoing) and credits the cash amount CHF n,nnnn.—.

4b. Bank U draws up a delivery notification for the customer (receipt) and debits him the cash amount of CHF n,nnnn.—and updates its second database.

According to the invention the system can be used for handling transactions of securities in/for a bank, the third external database being an account of an external depositary or a securities clearing house.

A clearing house in this case is an organisation that intervenes in the transaction between purchaser and vendor and guarantees to both parties the fulfilment of the business. A depositary undertakes to keep the securities with externally recognisable designation of each depositor separate from its own stocks and from those of third parties.

According to the invention, to extract data records with a higher probability the system preferably accesses data fields of the data record from which the transaction type, accounting direction, the quantity, the security identification, the security characteristics, the place of deposit, the date of the transaction, or the value date of the transaction results, for which inputting of a new corresponding data record into the second database is to take place.

The data fields of the data record are accessed according to the invention according to a dynamically or statically determinable order. This determination of the order can also be changed according to the invention depending on the entities respectively involved in the transaction (which banks, clearing houses, depositaries etc.) or the transactions themselves.

In the event of a difference between the new data record in the first database and a probably corresponding new data record in the external database, the system issues an error message if the system does not or cannot extract a data record that has a higher probability of being the correct corresponding new data record.

According to the invention, the system can in this case send a request to a supervisory authority of the first, the second and/or the external database to resolve the correspondence that cannot be produced between the data records.

Finally, the invention relates to a method, which is executed in the system outlined above, and a computer program product, which is designed to implement such a method if it is executed by a computer or a computer network.

BRIEF DESCRIPTION OF THE DRAWINGS

The invention is explained in greater detail below with reference to the enclosed drawing.

DETAILED DESCRIPTION OF EMBODIMENTS

Figure 1:
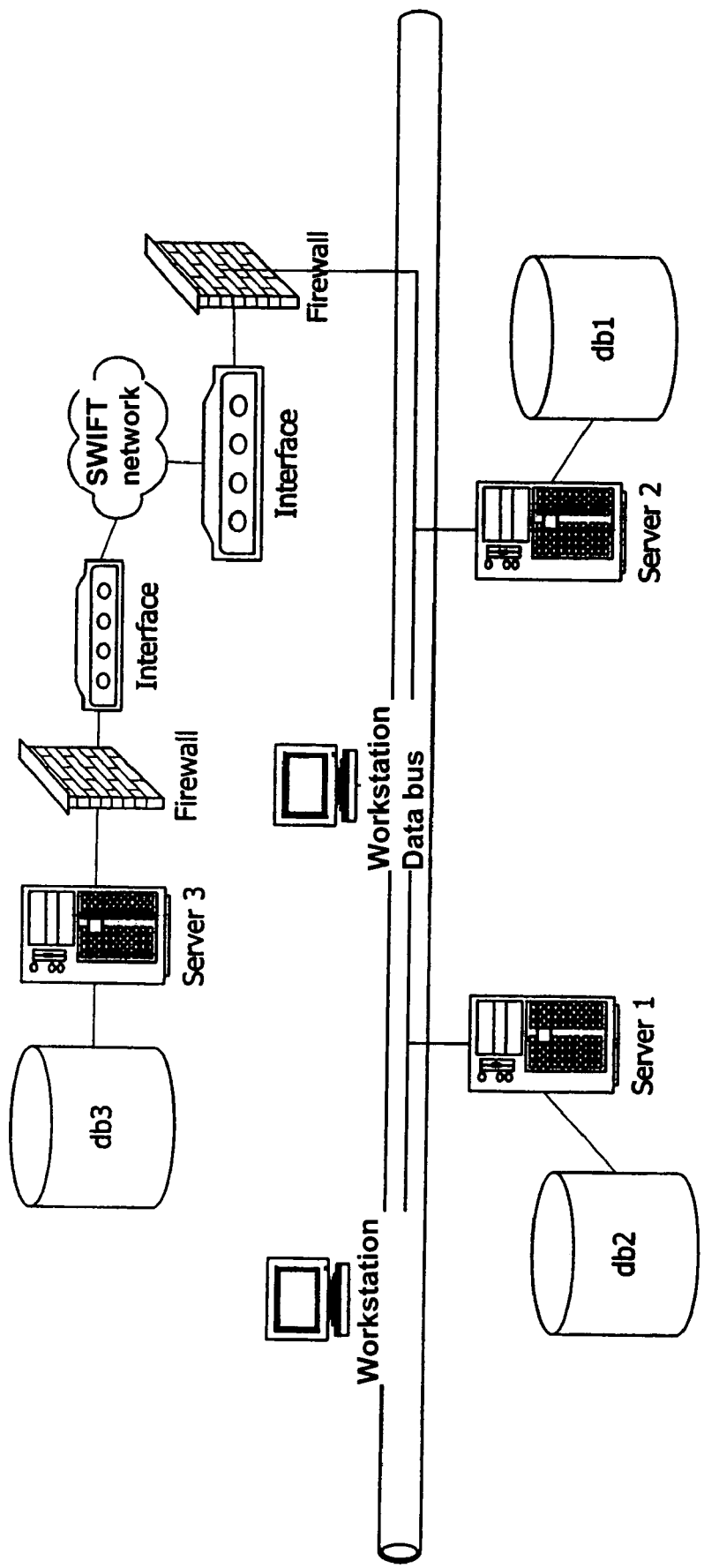
FIG. 1 illustrates schematically a computer system for implementing the system according to the invention.

In FIG. 1, a computer-implemented system for managing a database system with structured data records is illustrated. In the present embodiment the system is used to handle transactions of securities in a bank. This system has, in a network indicated only schematically as a bus, one or more servers (server 1, server 2) for database and program holding, as well as a large number of workstations. Two databases db1, db2 that are separate from one another and internal with reference to the bank are apparently maintained in the system at the two servers (server 1, server 2), which databases are to be managed with structured data records. The first database db1 is in this case an account of customer transactions (thus for example an account of a customer maintained at the bank). The second database db2 is a nostro account of the bank.

The workstations represent first, graphical and/or alphanumeric interfaces for a manual input at least of parts of a structured data record into one of the databases db1, db2, via which an employee of the bank can handle accounting processes. Not illustrated further, but likewise possible and conceived is the increasingly widespread input of transactions in so-called online banking, in which not a bank employee but the customer himself enters the data of the transaction into the computer network of the bank. To this end at least a second graphical and/or alphanumeric interface is provided for an input at least of parts of a structured data record via a network into one of the databases db1, db2.

Furthermore, a third, bidirectional interface for communication with an external database system db3 via a data network (SWIFT network) or a data direct line is provided. This interface is used to communicate parts of a structured data record between at least one of the internal databases db1, db2 and an external database db3 via an external server (server 3). Since the system in this embodiment is used to handle transactions of securities, the third, external database db3 represents an account of an external depositary of securities in this embodiment.

If in a security transaction inputting of a new data record ds takes place into the first database db1, inputting of a new corresponding data record into the second database db2 must also take place. However, the invention provides here that this is only undertaken if a confirmation from the external database db3 of the depositary or the securities clearing house arrives at the bank regarding the successful handling of the transaction in the sphere of the depositary (or the securities clearing house) in its—from the bank's viewpoint—external database db3.

In this case the invention provides for checking of the data record sent for confirmation by the depositary or the securities clearing house in the following way. Since normally a plurality of data records are communicated back and forth between the bank and the depositary (or the securities clearing house), the allocation is not directly possible. If an allocation can take place for example via a process identification, a comparison is carried out on the part of the bank of whether the new data record in the first database db1 and the probably corresponding new data record from the external database db3 actually correspond. In the case of a difference between the new data record in the first database db1 and a probably corresponding new data record from the external database db3, the probably corresponding new data record from the external database db3 is assigned a probability of being the actually corresponding new data record depending on the degree of difference. To do this, the system accesses data fields of the data record of the transaction sent by the external database, which fields yield

- the transaction type (for example delivery against payment, delivery without payment, dividend payment, capital increase, nominee registration etc.)
- the accounting direction (incoming/outgoing),
- the quantity,
- the security identification,
- the security characteristics (e.g. interest rate, maturity, currency),
- the place of deposit,
- the date of the transaction, or
- the value date of the transaction for which inputting of a new corresponding data record is to take place into the second database and compares them with the corresponding data field of the data record of the transaction from the first database db1 before the corresponding data field/fields of the data record of the transaction is/are input into the second database db2. The probability is assigned depending on the differences. This is carried out in the event of a difference existing for all data records that are supplied by the external database db3. If a data record is extracted from further data records from the external database db3 that has a higher probability of being the correct corresponding new data record to the data record to be input into the second database db2, this is assigned to the respective data record and input into the second database db2. In this case it is removed from the list of the data records supplied by the external database db3.

Since the error distribution in the individual data records (for example depending on the external depositary or the time of the data transfer or the transfer path) can vary, the invention provides that the system accesses the data fields of the data records to be compared according to a dynamically or statically determinable order.

In the event of a difference between the new data record in the first database db1 and a probably corresponding new data record from the external database db3, the system issues an error message if it does not extract any data record that has a higher probability of being the correct corresponding new data record. In particular, if the (error) probability assigned to the original probable data record exceeds a predeterminable threshold, so that it is to be assumed that an error that is not to be resolved exists here, the system sends a request to a supervisory authority of the first, the second and/or the external database to resolve the correspondence that cannot be produced between the data records.

What is claimed is:

1. Computer-implemented system for managing a database system with structured data records, in this system at least two internal databases (db1, db2) separate from one another being maintained, which databases are to be managed with structured data records concerning one or more transactions, at least a first, graphical and/or alphanumeric interface for a manual input at least of parts of a structured data record of a transaction into one of the databases being provided, and/or at least a second, graphical and/or alphanumeric interface for an input at least of parts of a structured data record of a transaction via a network into one of the databases (db1, db2) being provided, at least a third, bidirectional interface for communication with an external database system (db3) via a data network or a data direct line being provided, in order to communicate at least parts of a structured data record of a transaction between at least one of the internal databases (db1, db2) and the external database (db3), inputting of a new data record of a transaction into the first database (db1) initiating inputting of a new corresponding data record of the transaction into the second database (db2), (i) the inputting of the new corresponding data record of the transaction into the second database (db2) only taking place if a confirmation was received from the external database (db3) regarding the successful execution of the transaction, and (ii) in the event of a difference between the new data record in the first database (db1) and a potential corresponding new data record from the external database (db3), a probability being assigned to the potential corresponding new data record from the external database (db3) depending on the degree of difference, and (iii) from further data records from the external database (db3) a data record being extracted that has a higher probability of being the correct corresponding new data record from a large number of data records from the external database (db3) to the data record to be input into the second database (db2).

2. Computer-implemented system according to claim 1, in which the system is used for handling transactions of securities in/for a bank, and the first database (db1) being an account of customer transactions, and/or the second database (db2) being a nostro account of the bank.

3. Computer-implemented system according to claim 1, in which the system is used for handling transactions of securities in/for a bank, and the third database (db3) being an account of an external depositary of securities.

4. Computer-implemented system according to claim 1, in which the system for handling transactions of securities, to extract data records with higher probability, accesses data fields of the data record from which the transaction type, the accounting direction, the quantity, the security identification, the security characteristics, the place of deposit, the date of the transaction, or the value date of the transaction result, for which inputting of a new corresponding data record into the second database (db2) is to take place.

5. Computer-implemented system according to claim 4, in which the system accesses the data fields of the data record according to a dynamically or statically determinable order.

6. Computer-implemented system according to claim 1, in which the system in the event of a difference between the new data record in the first database (db1) and a potential corresponding new data record in the external database (db3) issues an error message if it does not extract any data record that has a higher probability of being the correct corresponding new data record.

7. Computer-implemented system according to claim 6, in which the system sends a request to a supervisory authority of the first, the second and/or the external database to resolve the correspondence that cannot be produced between the data records.

8. Computer-implemented method for managing a database system with structured data records, with the steps:
    maintenance of two internal databases (db1, db2) separate from one another, which are managed with structured data records concerning one or more transactions,
    provision of at least a first, graphical and/or alphanumeric interface for a manual input at least of parts of a structured data record of the transaction into one of the databases (db1, db2), and/or at least a second, graphical and/or alphanumeric interface for an input at least of parts of a structured data record of the transaction via a network into one of the databases (db1, db2)
    provision of at least a third, bidirectional interface for communication with an external database system (db3) via a data network or a data direct line, in order to communicate at least parts of a structured data record of the transaction between at least one of the internal databases (db1, db2) and the external database (db3),
    the inputting of the new corresponding data record of the transaction into the second database (db2) only taking place, if a confirmation was received from the external database, (db3) regarding the successful execution of the transaction, and
    in the event of a difference between the new data record in the first database (did) and a potential corresponding new data record from the external database (db3), a probability being assigned to the potential corresponding new data record from the external database (db3) depending on the degree of difference, and
    from further data records from the external database (db3) a data record being extracted that has a higher probability of being the correct corresponding new data record from a large number of data records from the external database (db3) to the data record to be input into the second database (db2).

9. Computer-implemented method according to claim 8, in which the system is used for handling transactions of securities in/for a bank, and the first database (db1) being an account of customer transactions, and/or the second database (db2) being a nostro account of the bank.

10. Computer-implemented method according to claim 8, which is used for handling transactions of securities in/for a bank, and the third, external database (db3) being an account of an external depositary.

11. Computer-implemented method according to claim 8, with the step that, for handling transactions of securities, to extract data records (dsj) with higher probability, accesses data fields of the data record from which the accounting direction, the quantity, the security identification, the security characteristics, the place of deposit, the date of the transaction, or the value date of the transaction result, for which inputting of a new corresponding data record into the second database (db2) is to take place.

12. Computer-implemented method according to claim 11, with the step that the data fields of the data record are accessed according to a dynamically or statically determinable order.

13. Computer-implemented method according to claim 8, with the step that in the event of a difference between the new data record in the first database (db1) and a potential corresponding new data record in the external database (db3) an error message is issued if it does not extract any data record that has a higher probability of being the correct corresponding new data record.

14. Computer-implemented method according to claim 13, with the step that a request is sent to a supervisory authority of the first, the second and/or the external database to resolve the correspondence that cannot be produced between the data records.

15. Computer program product, which is designed to execute the method according to claim 8 if it is executed by a computer or a computer network.

* * * * *